United States Patent [19]

Ralls

[11] Patent Number: 4,850,843

[45] Date of Patent: Jul. 25, 1989

[54] ICE CREAM SERVER

[76] Inventor: W. Fred Ralls, 9617 Great Hills Trail, Suite 624, Austin, Tex. 78759

[21] Appl. No.: 230,336

[22] Filed: Aug. 9, 1988

[51] Int. Cl.⁴ .............................................. A47J 43/20
[52] U.S. Cl. .................................... 425/279; 425/280; 425/281; 425/284
[58] Field of Search .............. 425/276, 277, 278, 279, 425/280, 281, 282, 284, 187

[56] References Cited

U.S. PATENT DOCUMENTS

| | | | |
|---|---|---|---|
| 1,508,915 | 9/1924 | Bidwell | 425/282 |
| 1,587,538 | 6/1926 | McLaughlin | 425/282 |
| 1,657,470 | 1/1928 | Holmes et al. | 425/280 |
| 1,667,734 | 5/1928 | Mook | 425/279 |
| 1,763,389 | 6/1930 | Chapman | 425/280 |
| 1,826,651 | 10/1931 | Chisholm | 425/280 |
| 1,966,089 | 7/1934 | Chester | 425/282 |
| 2,013,265 | 9/1935 | Chester | 425/282 |
| 2,076,416 | 4/1937 | Rust | 425/282 |
| 2,568,300 | 9/1951 | Poplawski | 425/187 |
| 3,377,963 | 4/1968 | Anderson | 425/280 |
| 3,421,456 | 1/1969 | Weinstein | 425/280 |
| 3,598,062 | 8/1071 | Weinstein | 425/284 |
| 3,784,341 | 1/1974 | Magalotti et al. | 425/280 |
| 4,758,150 | 7/1980 | Fanini et al. | 425/187 |

Primary Examiner—Jay H. Woo
Assistant Examiner—Khanh P. Nguyen
Attorney, Agent, or Firm—Gordon L. Peterson; Loyal M. Hanson

[57] ABSTRACT

An apparatus for use in scooping a scoop of ice cream from a container of ice cream includes a handle, a bowl supported on the handle, and a motor for rotating the bowl relative to the handle in order to facilitate the scooping of ice cream with the bowl. One embodiment includes a rotatable wiper blade mounted within the bowl, a first unidirectional clutch device that couples the bowl to the motor drive shaft when the drive shaft is rotating in a clockwise rotation, and a second unidirectional clutch device that inhibits bowl rotation when the drive shaft is rotating in a counterclockwise direction. The cutting edge or lip of the bowl may have sawtooth like projections, and an battery changer apparatus may be included for charging a battery power source housed in the handle.

9 Claims, 2 Drawing Sheets

ICE CREAM SERVER

BACKGROUND OF THE INVENTION

1. Technical Field

This invention relates generally to devices for dislodging and serving a scoop of ice cream from a container of ice cream, and more particularly to a new and improved ice cream server designed to facilitate the process.

2. Background Information

An ice cream server is used to transfer ice cream from a container to a serving location one scoop at a time, and a typical existing ice cream server includes a handle, a bowl, and a wiper mechanism for this purpose. In dishing up a scoop of ice cream, the user grasps the handle, scoops the bowl into the container of ice cream to dislodge a scoop, positions the bowl over the location where the scoop is to be deposited, and then actuates the wiper mechanism to scrape the scoop free from the bowl to complete the transfer.

However, there are certain problems in doing this that need to be overcome. For example, the ice cream may be very cold and therefore somewhat hard so that it is difficult to scoop into the bowl. The user must struggle to dislodge a scoop or just wait until the ice cream warms sufficiently to soften.

This problem is aggravated when by a half-full drum container. The user must reach into the drum, and this makes the process of dislodging a scoop all the more awkward. Consequently, it is desirable to have a new and improved ice cream server to facilitate the scooping of hard ice cream.

SUMMARY OF THE INVENTION

This invention alleviates the problem outlined above with a motorized ice cream server having a rotatable bowl, one embodiment including saw tooth projections on the lip of the bowl that cut into the ice cream at the push of a button. Thus, the ice cream server makes the scooping of hard ice cream far more convenient.

Generally, an ice cream server constructed according to a major aspect of the invention includes a handle, a bowl supported by the handle, and motor means supported by the handle for rotating the bowl relative to the handle in order to facilitate the scooping of ice cream with the bowl. These components may include a battery powered motor having a drive shaft and coupling means for coupling rotational movement from the drive shaft to the bowl. In addition, the bowl may include a lip having a plurality of sawtooth like projections arranged to facilitate the scooping of hard ice cream.

According to another aspect of the invention, the handle extends along a longitudinal axis of the handle, the drive shaft of the motor extends along a rotational axis of the motor, and the motor is mounted on the handle pivotally to enable a user to pivot the electric motor to a desired relationship of the longitudinal axis of the handle and the rotational axis of the motor.

According to yet another aspect of the invention, there is provided wiper means supported within the bowl for dislodging ice cream from the bowl. This may include a blade mounted within the bowl on the drive shaft.

According to still another aspect, the coupling means includes a first unidirectional clutch device for coupling rotational movement from the drive shaft to the bowl when the drive shaft is rotating in a clockwise direction, and a second unidirectional clutch device for inhibiting rotational movement of the bowl when the drive shaft is rotating in a counterclockwise direction. A reversing switch may be included in order to reverse the direction of motor rotation, and this enables a user to rotate the wiper blade without the bowl rotating by switching to the counterclockwise direction.

The above mentioned and other objects and features of this invention and the manner of attaining them will become apparent, and the invention itself will be best understood, by reference to the following description taken in conjunction with the accompanying illustrative drawings.

DESCRIPTION OF THE PREFERRED EMBODIMENTS

Figure 1:
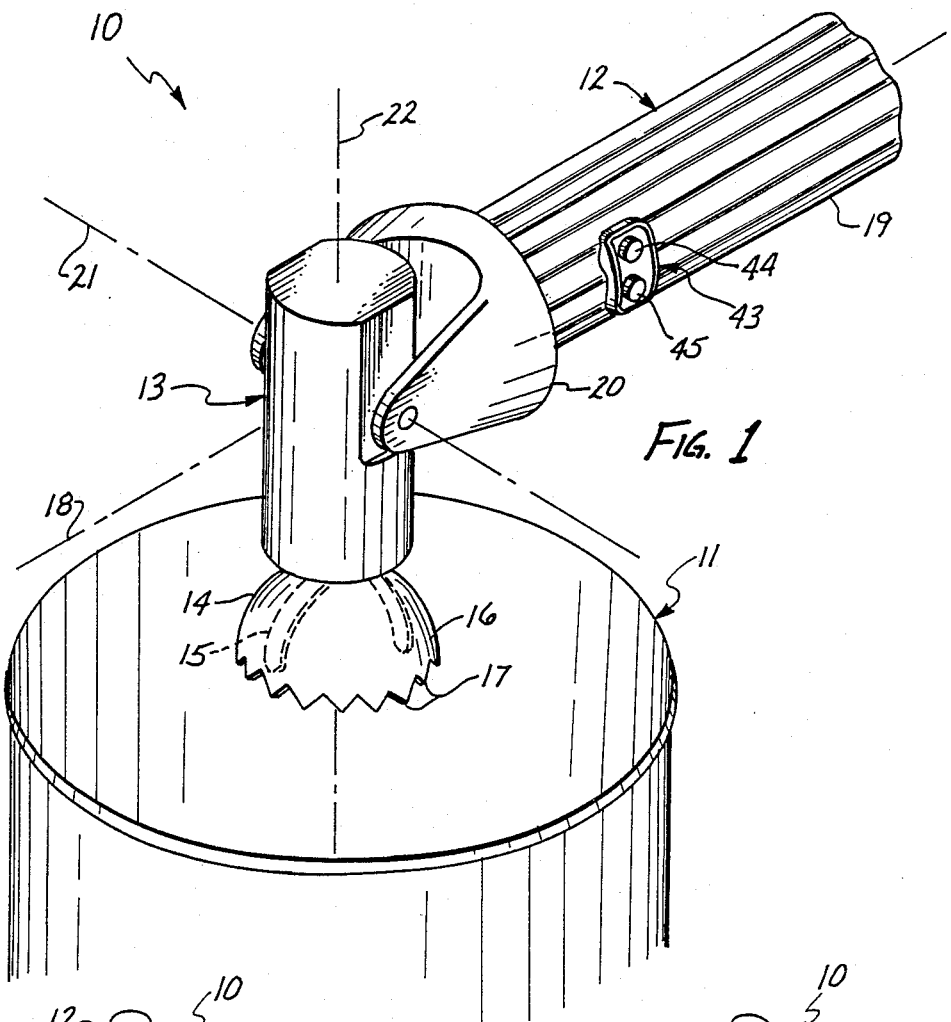
FIG. 1 of the drawings is a perspective view of an ice cream server constructed according to the invention shown adjacent a container of ice cream.

Referring now to the drawings, there is shown an ice cream server or apparatus 10 constructed according to the invention. It is illustrated in FIG. 1 above a conventional drum container 11 in a position to commence the process of scooping ice cream from the container.

Generally, the apparatus 10 includes a handle 12, a motor assembly 13, and a bowl 14 in which is mounted a wiper blade or blade 15. These components are arranged as subsequently described so that the motor assembly 13 causes the bowl 14 and the blade 15 to rotate relative to the handle 12 in order to facilitate the scooping of ice cream. A cutting edge portion or lip 16 of the bowl 14 includes a plurality of sawtooth like projections 17 that cut into the ice cream to further facilitate the scooping process.

As an idea of size, the illustrated handle assembly 12 is approximately four to five centimeters in diameter and approximately twenty centimeters long, while the lip 16 of the bowl 14 is about five centimeters in diameter. Of course, these dimensions are not critical and various sizes and shapes can be employed within the broader inventive concepts disclosed, preferably so that the apparatus 10 can be grasped conveniently by a user. Known materials such as injection molded thermoplastic compositions and metal alloys can be used.

The handle assembly 12 extends along a longitudinal axis 18 from a proximal portion 19 that the user grasps to a distal yoke portion 20 by which the motor assembly 13 is supported. The motor assembly 13 is mounted pivotally to the yoke portion 20 by known means such as screws and this enables pivotal movement about an axis 21. By pivoting the motor assembly 13 about the axis 21, the user can move a rotational axis 22 of the motor assembly 13 into a desired relationship with the longitudinal axis 18.

Figure 2:
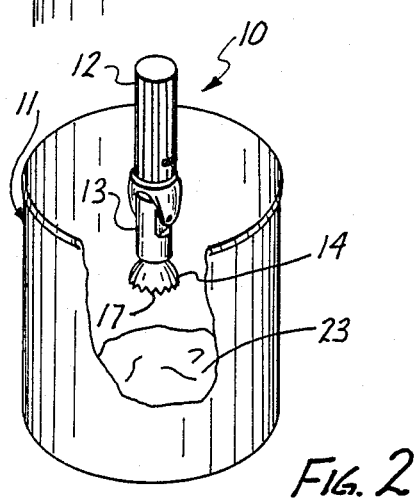
FIGS. 2 and 3 show operation of the ice cream server in dislodging a scoop.

When the two axes 18 and 22 are aligned as shown in FIG. 2, the apparatus 10 is disposed in a straight configuration that facilitates scooping from within the container 11. This is done by advancing the bowl 14 to the ice cream 23 and, while urging the bowl toward the ice cream, actuating the motor assembly 13 to cause the bowl 14 to rotate. This causes the sawtooth like projections 17 to cut into the ice cream 23 until the bowl 14 is filled with the ice cream which can then be removed.

Figure 3:
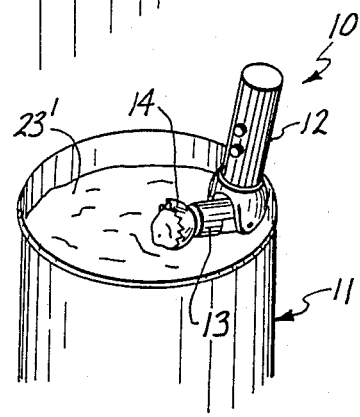

When there is sufficient ice cream 23' in the container 11 as depicted in FIG. 3, the motor assembly 13 can be pivoted to the ninety degree position illustrated in FIGS. 1 and 3.

Figure 4:
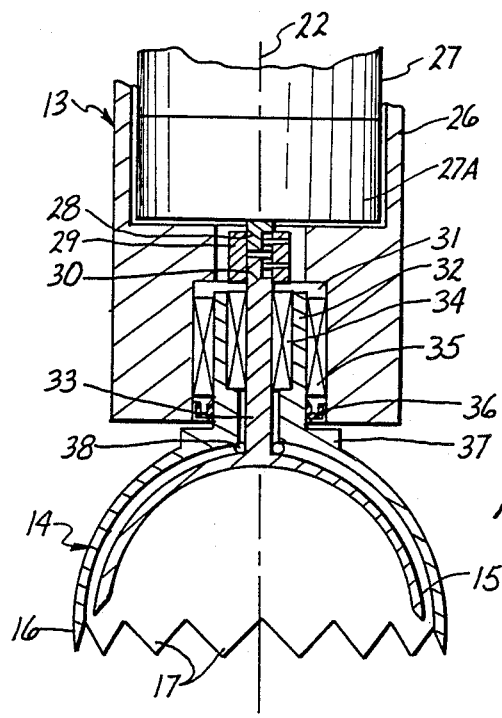
FIG. 4 is an enlarged cross sectional view of the distal end of the ice cream server.

Considering now FIG. 4, there is shown an enlarged portion of the motor assembly 13, the bowl 14, and wiper 15. The motor assembly 13 includes a housing 26 in which is mounted an electric motor 27. Although any of various types of motors may be used within the inventive concepts disclosed, the illustrated electric motor 27 is a reversible, direct current motor, such as the type utilized in commercially available battery-powered screwdrivers. It includes a known type of gearbox 27A, such as a planetary gearbox, to provide a desired speed reduction and sufficient torque.

The electric motor 27 is mounted with the gearbox 27A within the housing 26 according to known techniques, and it includes a drive shaft 28 aligned with the rotational axis 22. A collar or other suitable known type of coupler device 29 couples the drive shaft 28 to a wiper shaft 30 attached to the wiper blade 15. Thus, the wiper blade 15 rotates with the drive shaft 28: when the drive shaft 28 rotates in a clockwise direction, it causes the wiper blade 15 to rotate in a clockwise direction about the rotational axis 22; when the drive shaft 28 rotates in a counterclockwise direction, it causes the wiper blade 15 to rotate in a counterclockwise direction.

The bowl 14 is also mounted on the housing 26 for rotation about the rotational axis 22. For this purpose, the housing 26 is configured to define a cylindrically shaped recess 31 extending along the rotational axis 22 and the bowl 14 is configured to include a cylindrically shaped shaft portion 32 that fits into the recess 31.

The shaft portion 32 defines a through bore 33 through which the wiper blade shaft 30 extends. The wiper blade shaft 30 is rotatably mounted within the through bore 33 with a first unidirectional clutch device 34, and the shaft portion 32 of the bowl 14 is rotatably mounted with the recess 31 with a second unidirectional clutch device 35.

The first and second unidirectional clutch devices 34 and 35 are known types of components, such as the commercially available drawn cup roller clutches manufactured by the Torrington Company of Torrington, Connecticut. These devices include precisely formed interior ramps that provide surfaces against which rollers wedge to positively lock the clutch with the shaft when rotated in one direction while allowing rotation in the other direction.

The first and second unidirectional clutch devices 34 and 35 are mounted so the first device 34 couples rotational movement from the drive shaft 28 to the bowl 14 only when the drive shaft 28 is rotating in a clockwise direction, and so that the second device 35 inhibits rotation of the bowl 14 when the drive shaft 28 is rotating in the counterclockwise direction. It inhibits rotation by locking the shaft portion 32 of the bowl 14 to the housing 26.

Thus, the bowl 14 and the wiper blade 15 rotate together with the drive shaft 28 when the drive shaft rotates in the clockwise direction. But the bowl 14 is locked against rotating with the wiper lade 15 when the drive shaft 28 rotates in the counterclockwise direction. Of course, the devices 34 and 35 can be mounted for operation in the other direction. In other words, they can be mounted so that the wiper blade 15 and the bowl 14 rotate together in a counterclockwise direction, locking the shaft portion 32 of the bowl 14 to the housing 26 when the drive shaft 28 rotates in the clockwise direction this being accomplished, for example (as is apparent to one skilled in the art from the description herein of FIG. 4), by mounting the device 34 and 35 upside down relative to the orientation employed for the operation described in the preceding paragraph, and, of course, FIG. 4 is intended to depict either orientation.

In addition to the above, the apparatus 10 includes a sealing ring 36 that provides a seal between the housing 26 and a shoulder portion 37 of the bowl 14. An O-ring seal 38 is also included to provide a seal between the wiper blade 15 and the bowl 14.

Figure 5:
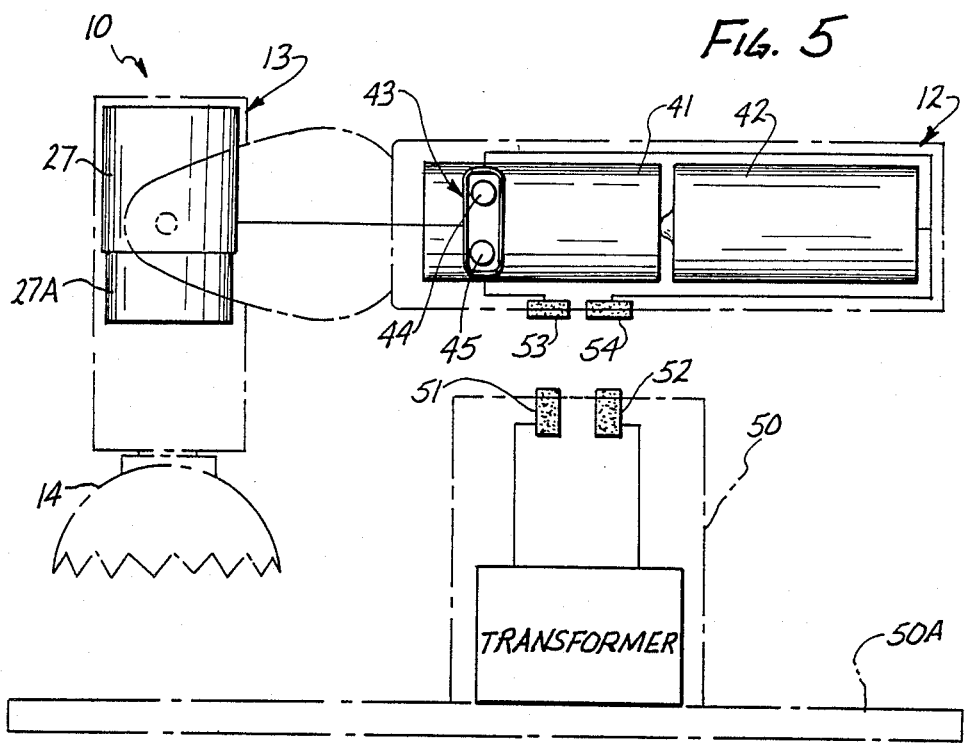
FIG. 5 is a diagrammatic view showing electrical interconnections and an accompanying battery charger.

Electrical details are shown in the diagrammatic view of FIG. 5. The handle assembly is dimensioned and arranged to contain rechargeable batteries 41 and 42 (conventional size "C" flashlight batteries, for example). A switch 43 is included to enable a user to energize the motor assembly 13. It is a two pole, two throw, center-off, momentary rocker switch that is covered by a liquid-tight, flexible membrane that seals against moisture/water when washed. Depressing a first side 44 of the switch 43 connects the batteries 41 and 42 to the motor assembly 13 to cause the motor 27 to rotate the shaft 28 in the clockwise direction, and depressing a second side 45 connects the batteries 41 and 42 with the polarity reversed to cause the motor 27 to rotate the shaft 28 in the counterclockwise direction.

A battery charger 50 is also provided that includes a stand 50A. The battery charger 50 operates on household current, and it is configured according to known techniques for use in charging the batteries 41 and 42. A pair of magnetic contacts 51 and 52 on the battery charger 50 mate with another pair of magnetic contacts 53 and 54 on the handle assembly 12 to serve the dual purpose of securing the apparatus 10 to the battery charger 50 and conducting a battery charging current from the battery charger 50 to the batteries 41 and 42. The contacts 51 and 53 attract each other magnetically for this purpose, as do the contacts 52 and 54.

Thus, this invention provides a new and improved ice cream server that greatly facilitates the ice cream scooping process, especially if the ice cream is hard and the container nearly empty.

Although an exemplary embodiment of the invention has been shown and described, many changes, modifications, and substitutions may be made by one having ordinary skill in the art without necessarily departing from the spirit and scope of the invention.

What is claimed is:

1. An apparatus, comprising:
   a handle having a longitudinal axis, the handle extending along the longitudinal axis from a proximal portion of the handle to a distal portion of the handle, which handle is dimensioned and arranged to house a separate battery power source;
   a motor assembly having a rotational axis and a drive shaft arranged for rotation about the rotational axis of the motor assembly in a selected clockwise or counterclockwise direction;
   the motor assembly being mounted on the distal portion of the handle for pivotal movement relative to the handle in order to enable a user to pivot the rotational axis of the motor assembly relative to the longitudinal axis of the handle for ice cream serving purposes;

a bowl mounted on the motor assembly for rotation about the rotational axis of the motor assembly, which bowl opens outwardly away from the motor assembly;

the bowl having a lip portion disposed in a plane generally perpendicular to the rotational axis of the motor assembly and a shaft portion with a through-bore extending along the rotational axis of the motor assembly;

a wiper blade mounted on the motor assembly for rotation within the bowl about the rotational axis of the motor assembly, the wiper blade being coupled to the drive shaft of the motor assembly through the through-bore of the shaft portion of the bowl;

first unidirectional coupling means for coupling rotational movement from the drive shaft to the shaft portion of the bowl only when the drive shaft is rotating in a clockwise direction; and second unidirectional coupling means for inhibiting rotation of the bowl when the drive shaft is rotating in a counterclockwise direction.

2. An apparatus as recited in claim 1, further comprising:

means for enabling a user to cause the drive shaft to rotate in the selected clockwise or counterclockwise direction.

3. An apparatus as recited in claim 2, wherein the means for enabling includes:

a reversing switch mounted on the handle.

4. An apparatus as recited in claim 1, wherein the first unidirectional coupling means includes:

a first unidirectional clutch device.

5. An apparatus as recited in claim 1, wherein the second unidirectional coupling means includes:

a second unidirectional clutch device.

6. An apparatus as recited in claim 1, wherein the bowl includes:

a lip having a plurality of sawtooth like projections arranged to facilitate the scooping of hard ice cream.

7. An apparatus as recited in claim 1, further comprising:

a battery charger apparatus.

8. An apparatus as recited in claim 7, wherein:

the handle is dimensioned and arranged to house a battery power source for the motor;

the handle includes a first pair of magnetic contacts; and the battery charger apparatus includes a second pair of magnetic contacts arranged to mate with the first pair of magnetic contacts to facilitate connection of the battery charger apparatus to a battery power source housed by the handle for battery charging purposes.

9. An apparatus, comprising:

a handle having a longitudinal axis, the handle extending along the longitudinal axis from a proximal portion of the handle to a distal portion of the handle, which handle is dimensioned and arranged to house a separate battery power source;

a motor assembly having a rotational axis and a drive shaft arranged for rotation about the rotational axis of the motor assembly in a selected clockwise or counterclockwise direction;

the motor assembly being mounted on the distal portion of the handle for pivotal movement relative to the handle in order to enable a user to pivot the rotational axis of the motor assembly relative to the longitudinal axis of the handle for ice cream serving purposes;

a bowl mounted on the motor assembly for rotation about the rotational axis of the motor assembly, which bowl opens outwardly away from the motor assembly;

the bowl having a lip portion disposed in a plane generally perpendicular to the rotational axis of the motor assembly and a shaft portion with a through-bore extending along the rotational axis of the motor assembly;

a wiper blade mounted on the motor assembly for rotation within the bowl about the rotational axis of the motor assembly, the wiper blade being coupled to the drive shaft of the motor assembly through the through-bore of the shaft portion of the bowl;

first unidirectional coupling means for coupling rotational movement from the drive shaft to the shaft portion of the bowl only when the drive shaft is rotating in a counterclockwise direction; and second unidirectional coupling means for inhibiting rotation of the bowl when the drive shaft is rotating in a clockwise direction.

* * * * *